(12) United States Patent
Fukaya et al.

(10) Patent No.: US 10,859,800 B2
(45) Date of Patent: Dec. 8, 2020

(54) IMAGING LENS

(71) Applicant: KANTATSU CO., LTD., Yaita (JP)

(72) Inventors: Hisao Fukaya, Sukagawa (JP); Kenichi Kamada, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

(21) Appl. No.: 15/478,605

(22) Filed: Apr. 4, 2017

(65) Prior Publication Data
US 2018/0059377 A1   Mar. 1, 2018

(30) Foreign Application Priority Data

Apr. 4, 2016  (JP) ................. 2016-074946

(51) Int. Cl.
*G02B 13/00* (2006.01)
*G02B 9/62* (2006.01)
*G02B 13/06* (2006.01)
*G02B 27/00* (2006.01)

(52) U.S. Cl.
CPC .......... *G02B 13/0045* (2013.01); *G02B 9/62* (2013.01); *G02B 13/06* (2013.01); *G02B 27/0025* (2013.01)

(58) Field of Classification Search
CPC ...... G02B 13/0045; G02B 9/62; G02B 13/18; G02B 3/04
USPC ........................................................ 359/713
See application file for complete search history.

(56) References Cited

U.S. PATENT DOCUMENTS

| 2012/0243108 A1 | 9/2012 | Tsai et al. |
| 2014/0063616 A1 | 3/2014 | Okano et al. |
| 2014/0192422 A1 | 7/2014 | Tang et al. |
| 2014/0320980 A1 | 10/2014 | Chen |
| 2014/0320981 A1 | 10/2014 | Hsieh et al. |
| 2015/0085378 A1 | 3/2015 | Jung et al. |
| 2016/0018627 A1 | 1/2016 | Lee |
| 2016/0124192 A1 | 5/2016 | Koreeda |
| 2016/0170182 A1 | 6/2016 | Tanaka |

FOREIGN PATENT DOCUMENTS

| CN | 202330843 U | 7/2012 |
| CN | 104238073 A | 12/2014 |
| CN | 204129311 U | 1/2015 |
| CN | 204241750 U | 4/2015 |
| CN | 204422849 U | 6/2015 |

(Continued)

*Primary Examiner* — Kristina M Deherrera
(74) *Attorney, Agent, or Firm* — Oliff PLC

(57) ABSTRACT

Compact imaging lens which maintains low-profileness, wide field of view, and properly corrects various aberrations. Imaging lens includes first lens having positive refractive power and convex surface facing object side near an optical axis, second lens having negative refractive power and concave surface facing image side near optical axis, third lens having positive refractive power and concave surface facing image side near optical axis as double-sided aspheric lens, fourth lens having meniscus shape with positive refractive power and concave surface facing object side near optical axis, fifth lens as double-sided aspheric lens, and sixth lens having negative refractive power and concave surface facing image side near optical axis as double-sided aspheric lens, and conditional expression is satisfied: (1) $0.6<\Sigma d/f<1.0$, where $\Sigma d$ denotes distance along optical axis from object-side surface of first lens to image-side surface of sixth lens, and f denotes focal length of overall optical system of imaging lens.

18 Claims, 10 Drawing Sheets

(56) References Cited

FOREIGN PATENT DOCUMENTS

| | | |
|---|---|---|
| CN | 204422851 U | 6/2015 |
| CN | 204422854 U | 6/2015 |
| CN | 104808319 A | 7/2015 |
| CN | 204439918 U | 7/2015 |
| CN | 204462518 U | 7/2015 |
| CN | 105319677 A | 2/2016 |
| JP | 2012-155223 A | 8/2012 |
| JP | 2014-44373 A | 3/2014 |
| JP | 2015-158569 A | 9/2015 |
| KR | 101504029 B1 | 3/2015 |
| TW | 201305595 A | 2/2013 |
| TW | 201317620 A | 5/2013 |
| TW | 201331617 A | 8/2013 |
| TW | 201333518 A | 8/2013 |
| TW | 201333575 A | 8/2013 |
| TW | 201348789 A | 12/2013 |
| TW | 201405162 A | 2/2014 |
| TW | 201411182 A | 3/2014 |
| TW | 201423147 A | 6/2014 |
| TW | M479426 U | 6/2014 |
| TW | 201447360 A | 12/2014 |
| TW | 201516453 A | 5/2015 |
| TW | M504250 U | 7/2015 |
| WO | 2013/145547 A1 | 10/2013 |
| WO | 2014/006822 A1 | 1/2014 |
| WO | 2016/092944 A1 | 6/2016 |

IMAGING LENS

The present application is based on and claims priority of Japanese patent application No. 2016-074946 filed on Apr. 4, 2016, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device, and more particularly to an imaging lens which is built in an imaging device mounted in an increasingly compact and low-profile smartphone and mobile phone, PDA (Personal Digital Assistant), a game console, an information terminal such as a PC and a robot, and a home appliance or a car with a camera function.

Description of the Related Art

In recent years, it becomes common that a camera function is mounted in many information terminals. Furthermore, products have been made one after another, such as home appliances with the camera, which are excellent in convenience. It is expected that demand of products such as the home appliances and information terminals with the camera function is increased, and development of products is rapidly proceeded accordingly in the future.

As an imaging lens mounted in such information terminal, for example, following Patent Documents 1 and 2 disclose a conventional imaging lens composed of six constituent lenses.

Patent Document 1 (JP-A-2012-155223) discloses an imaging lens comprising in order from an object side thereof, a first lens group having positive refractive power, a second lens group having negative refractive power, a third lens group having positive refractive power, a fourth lens group having negative refractive power, a fifth lens group having positive refractive power, and a sixth lens group having negative refractive power.

Patent Document 2 (US-2012-0243108-A) discloses an imaging lens comprising in order from an object side thereof, a first lens having positive refractive power and a convex surface facing an object side, a second lens, a third lens, a fourth lens having at least an aspheric surface, a fifth lens having a convex surface facing an object side and a concave surface facing an image side, and a sixth lens having concave surfaces facing the object side and the image side and having at least an aspheric surface.

The imaging lens disclosed in the above Patent Document 1 has a total track length of about 8.0 mm and its field of view is about 66 to 70 degrees, however, requirement for low-profileness and a wide field of view is not fully satisfied. Furthermore, when a lens structure of Patent Document 1 is used to obtain the low-profileness and wide field of view, it is difficult to correct aberration in the peripheral area of the image and high optical performance throughout the image is not ensured.

The imaging lens disclosed in the above Patent Document 2 has field of view of only about 70 degrees and F-value is 2.6 to 3.0, therefore, it does not have brightness enough for the image sensor which is compact and has high pixels. An embodiment 5 of the Patent Document 2 discloses an imaging lens which has relatively high brightness and F-value of 2.4, however, its field of view is 67 degrees and requirement of the wide field of view is not fully satisfied. Accordingly, the lens structure of the Patent Document 2 also has a problem in correction of aberration in the peripheral area, when a lens system having the wide field of view and relatively high brightness is obtained while achieving low-profileness.

SUMMARY OF THE INVENTION

The present invention has been made in view of the above problems, and an object of the present invention is to provide an imaging lens which effectively obtains low-profileness, satisfies low F-value and a wide field of view in well balance, properly corrects aberrations and has high resolution.

Here, low-profile implies that total track length is smaller than 5.5 mm, and ratio of total track length to diagonal length is smaller than 0.8, and low F-value implies brightness having F2.3 or less. A wide field of view implies that the field of view is 75 degrees or more which is a scope capable of photographing. The diagonal length of the effective imaging plane of the image sensor for showing the ratio of total track length to diagonal length is taken as equal to the diameter of an effective imaging circle whose radius is the vertical height from an optical axis to the point where a light ray incident on the imaging lens at a maximum field of view enters the image plane, namely twice length of maximum image height.

Regarding terms used in the present invention, a convex surface or a concave surface means that the paraxial portion (portion near the optical axis) of the surface is convex or concave. The total track length is defined as distance along the optical axis from an object-side surface of an optical element nearest to the object side to the imaging plane, when thickness of the optical element such as an IR cut filter or cover glass located between a last lens and the imaging plane is regarded as an air.

The imaging lens according to the present invention comprises a first lens having positive refractive power and a convex surface facing an object side near an optical axis, a second lens having negative refractive power and a concave surface facing an image side near the optical axis, a third lens having positive refractive power and a concave surface facing the image side near the optical axis as a double-sided aspheric lens, a fourth meniscus lens having positive refractive power and a concave surface facing the object side near the optical axis, a fifth lens as a double-sided aspheric lens, and a sixth lens having negative refractive power and a concave surface facing the image side near the optical axis as a double-sided aspheric lens.

The first lens has positive refractive power. The first lens has relative strong positive refractive power among six constituent lenses, and obtains low-profileness and a wide field of view. Regarding a shape of the first lens, the first lens only has the convex surface facing the object side near the optical axis, and may have a meniscus shape with the convex surface facing the object side or biconvex shape near the optical axis.

The second lens properly corrects spherical aberration and chromatic aberration occurred at the first lens. Regarding a shape of the second lens, the second lens only has the concave surface facing the image side near the optical axis, and may have a meniscus shape with the concave surface facing the image side or biconcave shape near the optical axis.

The third lens is the double-sided aspheric lens, and corrects chromatic aberration on the optical axis, high-level spherical aberration, coma aberration, and field curvature.

The fourth lens corrects chromatic aberration on the optical axis, high-order spherical aberration, coma aberration, and field curvature. Also, the fourth lens has appropriate positive refractive power and maintains low-profileness.

The fifth lens is the double-sided aspheric lens, and formed to help correction of field curvature and distortion, and control of an angle of light ray incident to an image sensor which the sixth lens carries out. Regarding a shape of the fifth lens, the fifth lens may have meniscus shape with the convex or the concave surface facing the object side, or biconvex or biconcave shape near the optical axis. Also, the fifth lens may be a one-sided or a double-sided plane lens near the optical axis.

The sixth lens secures back focus while maintaining low-profileness. Also, the sixth lens is the double-sided aspheric lens, and carries out the correction of field curvature and distortion, and control of an angle of light ray incident to the image sensor. An object-side surface near the optical axis of the sixth lens may be a concave or a convex surface. It is desirable that an image-side surface is formed as aspheric and becomes a convex surface separated from the optical axis. Namely, the image-side surface desirably has a pole point separated from the optical axis. Hereby, the angle of light ray incident to the image plane can be properly controlled. The pole point mentioned herein implies an off-axial point on an aspheric surface at which a tangential plane intersects the optical axis perpendicularly.

According to the imaging lens having the above structure, composite refractive power of the first lens and the second lens is positive, and composite refractive power of the fourth lens, the fifth lens and the sixth lens is negative. Hereby, total track length can be small in length.

According to such structure, a lens group of the first lens and the second lens having the positive composite refractive power contributes to the low-profileness, the wide field of view and proper correction of chromatic aberration of the imaging lens.

It is a preferable condition that a below conditional expression (a) is satisfied:

$$0.5 < f12/f < 2.0 \quad (a)$$

where
f12: the composite focal length of the first and second lenses, and
f: the focal length of the overall optical system of the imaging lens.

The third lens is relative large in an absolute value of the focal length, namely relative small in the refractive power, and is the double-sided aspheric lens. Therefore, the third lens contributes to correction of various aberrations.

A lens group of the fourth lens, the fifth lens and the sixth lens having the negative composite refractive power or relatively weak positive refractive power maintain the low-profileness and mainly correct various aberrations in a position off the optical axis.

When the composite refractive power of the fourth lens, the fifth lens and the sixth lens become negative, it is a preferable condition that a below conditional expression (b) is satisfied. On the other hand, when the composite refractive power of the fourth lens, the fifth lens and the sixth lens become positive, it is a preferable condition that a below conditional expression (b') is satisfied:

$$-5.0 < f456/f < -1.0 \quad (b)$$

$$10 < f456/f \quad (b')$$

where
f456: the composite focal length of the fourth lens, the fifth lens and the sixth lens, and
f: the focal length of the overall optical system of the imaging lens.

(i) According to the imaging lens having the above structure, when a below conditional expression (1) is satisfied, the low-profileness of the imaging lens is provided:

$$0.6 < \Sigma d/f < 1.0 \quad (1)$$

where
$\Sigma d$: distance along the optical axis from an object-side surface of the first lens to an image-side surface of the sixth lens, and
f: the focal length of the overall optical system of the imaging lens.

(ii) According to the imaging lens having the above structure, it is preferable to satisfy a below conditional expression (2):

$$0.5 < (T1/f)*100 < 2.0 \quad (2)$$

where
T1: distance along the optical axis from the image-side surface of the first lens to the object-side surface of the second lens, and
f: the focal length of the overall optical system of the imaging lens.

The conditional expression (2) defines an appropriate range of distance between the first lens and the second lens. If the value is below the upper limit, there are suppressed increase in distortion to a plus side and increase in astigmatism difference in a peripheral area of an image, and high image-forming performance can be obtained. On the other hand, if the value is above the lower limit, there are suppressed increase in distortion to a minus side and increase in field curvature to the minus side, and the high image-forming performance can be obtained. Furthermore, when the value is below the upper limit, a distance between the first lens and the second lens is suppressed not to be large, it is advantageous to the low-profileness, and error sensitivity due to eccentricity of the first lens and the second lens can be reduced.

(iii) According to the imaging lens having the above structure, it is preferable to satisfy a below conditional expression (3):

$$0.5 < r4/f < 1.5 \quad (3)$$

where
r4: curvature radius of the image-side surface of the second lens, and
f: the focal length of the overall optical system of the imaging lens.

The conditional expression (3) defines an appropriate range of relationship the curvature radius of the image-side surface of the second lens and the focal length of the overall optical system of the imaging lens. If the value is below the upper limit of the conditional expression (3), axial chromatic aberration occurred at the first lens is properly corrected. On the other hand, if the value is above the lower limit of the conditional expression (3), there are suppressed increase in the angle of light ray incident to the peripheral area of the image-side surface of the second lens and occurrence of coma aberration, and sensitivity to manufacturing error is lowered.

(iv) According to the imaging lens having the above structure, it is preferable that the third lens has a meniscus shape with a convex surface facing the object side near the optical axis.

When the third lens has a meniscus shape with a convex surface facing the object side near the optical axis, proper correction is made to axial chromatic aberration, high-order spherical aberration, coma aberration, and field curvature.

(v) According to the imaging lens having the above structure, it is preferable that an object-side surface and an image-side surface of the fifth lens are made as plane near the optical axis, and as the optical element which substantially do not have refractive power near the optical axis. The optical system completed to a certain extent can be obtained with five lenses having refractive power other than the fifth lens. When the fifth lens is added thereto as the optical element as a double-sided aspheric lens without substantive refractive power near the optical axis, aspheric surfaces of the double sides properly correct the various aberrations without influencing the focal length of the overall optical system of the imaging lens or refractive power distribution of each lens having the refractive power.

The image-side surface and the object-side surface of the fifth lens are not limited to the plane near the optical axis. If the refractive power is within a scope that the influence to the focal length of the overall optical system or the refractive power of each lens is suppressed to be small, the fifth lens may have various options of shapes, such as, near the optical axis, the meniscus shape with a convex surface facing the object side, biconvex shape with the convex surfaces facing the object side and the image side, the meniscus shape with a concave surface facing the object side, biconcave shape with concave surfaces facing the object side and the image side, a shape that the object-side surface is plane and the image-side surface is convex or concave, a shape that the image-side surface is plane and the object-side is convex or concave, and so on. Herein, it is a preferable condition that a below conditional expression (c) is satisfied:

$$4.0 < |f5|/f \qquad (C)$$

where
f5: focal length of the fifth lens, and
f: focal length of the overall optical system of the imaging lens.

(vi) According to the imaging lens having the above structure, it is preferable that a refractive index of the second lens at d-ray is more than 1.64 and less than 1.70.

The second lens has a function for correcting chromatic aberration and spherical aberration occurred at the first lens. When the refractive index of the second lens at d-ray is more than 1.64 and less than 1.70, proper effect of aberration correction can be obtained. Additionally, if the refractive index is within this range, it is capable of selecting plastic materials of a low price and facilitating manufacture.

(vii) According to the imaging lens having the above structure, it is preferable that a refractive index of at least one lens among the third to fifth lenses at d-ray is more than 1.64 and less than 1.70.

When the refractive index within the above range is applied to the third lens and the fourth lens having the positive refractive power, for example, aberration correction of the lens is facilitated while maintaining the low-profileness. When the fifth lens without substantive refractive power is applied, the aberration correction in the peripheral area is facilitated while maintaining the small lens distance.

(viii) According to the imaging lens having the above structure, it is preferable to satisfy a below conditional expression (4) in terms that the imaging lens of sufficient low-profileness is obtained:

$$TTL/2ih \leq 0.8 \qquad (4)$$

where
TTL: distance along the optical axis from an object-side surface of the first lens to an image plane, and
ih: maximum image height.

(ix) According to the imaging lens having the above structure, it is preferable to satisfy a below conditional expression (5):

$$0.4 < T2/T3 < 1.5 \qquad (5)$$

where
T2: distance along the optical axis from an image-side surface of the second lens to an object-side surface of the third lens, and
T3: distance from an image-side surface of the third lens to an object-side surface of the fourth lens.

The conditional expression (5) relates the third lens which is disposed between a lens group of the first lens and the second lens, and another lens group of the fourth lens, the fifth lens and the sixth lens, defines an appropriate range of these distance along the optical axis, and is a condition for carrying out the low-profileness and proper aberration correction. If the value is below the upper limit, a distance between the second lens and the third lens is suppressed not to be so large, and the low-profileness is facilitated. On the other hand, if the value is above the lower limit, a distance between the third lens and the fourth lens is suppressed not to be so large, the third lens is located at an appropriate position, and correction function of various aberrations of this lens is made effective.

(x) According to the imaging lens having the above structure, it is preferable to satisfy below conditional expressions (6) and (7):

$$0.2 < (T4/f)*100 < 4.0 \qquad (6)$$

$$2.0 < (T5/f)*100 < 8.0 \qquad (7)$$

where
T4: distance along the optical axis from an image-side surface of the fourth lens to an object-side surface of the fifth lens,
T5: distance from an image-side surface of the fifth lens to an object-side surface of the sixth lens, and
f: focal length of the overall optical system of the imaging lens.

In relation to the lens group of the fourth lens, the fifth lens and the sixth lens, the conditional expression (6) defines an appropriate range of a distance between the fourth lens and the fifth lens. The conditional expression (7) defines an appropriate range of a distance between the fifth lens and the sixth lens.

If the value is below the upper limit of the conditional expression (6), a distance between the fourth lens and the fifth lens is suppressed not to be so large and the low-profileness is facilitated. On the other hand, if the value is above the lower limit of the conditional expression (6), the fifth lens is prevented from approaching too much or contacting to the fourth lens.

If the value is below the upper limit of the conditional expression (7), a distance between the fifth lens and the sixth lens is suppressed not to be so large and the low-profileness is facilitated. On the other hand, if the value is above the lower limit of the conditional expression (7), the fifth lens is prevented from approaching to the sixth lens too much, and flexibility of shape of the aspheric surface formed on both sides of the lens is increased.

(xi) According to the imaging lens having the above structure, it is preferable to satisfy a below conditional expression (8):

$$-0.7 < f1/f2 < -0.15 \qquad (8)$$

where
f1: focal length of the first lens, and
f2: focal length of the second lens.

The conditional expression (8) is a condition for suppressing the chromatic aberration, the astigmatism, and the field curvature within a proper scope while providing the low-profileness of the imaging lens. If the value is below the upper limit, the refractive power of the first lens is suppressed not to be relatively so large, and the axial chromatic aberration is properly corrected. Additionally, increase of astigmatic difference and field curvature is suppressed, and high image-forming performance can be obtained. On the other hand, if the value is above the lower limit, the refractive power of the first lens is suppressed not to be relatively so small, and the low-profileness is facilitated. Additionally, increase of the astigmatic difference is suppressed, and the high image-forming performance can be obtained.

(xii) According to the imaging lens having the above structure, it is preferable to satisfy a below conditional expression (9):

$$-4.5 < f2/f < -1.2 \qquad (9)$$

where
f2: focal length of the second lens, and
f: focal length of the overall optical system of the imaging lens.

The conditional expression (9) defines an appropriate range of the focal length of the second lens to the focal length of the overall optical system of the imaging lens, and is a condition for providing both of the low-profileness and proper correction of the chromatic aberration. If the value is below the upper limit, the negative refractive power of the second lens is suppressed not to be so large, thereby it becomes advantageous to the low-profileness of the imaging lens and excessive correction of the chromatic aberration, namely, increase in a small wavelength side to the plus direction in relation to a reference wavelength, is suppressed. Additionally, increase in the manufacturing error sensitivity can be prevented. On the other hand, if the value is above the lower limit, the negative refractive power of the second lens is suppressed not to be so small, and deficiency of correction of the chromatic aberration, namely, increase in a small wavelength side to the minus direction in relation to a reference wavelength, is suppressed.

(xiii) According to the imaging lens having the above structure, it is preferable to satisfy a below conditional expression (10):

$$3.0 < f3/f \qquad (10)$$

where
f3: focal length of the third lens, and
f: focal length of the overall optical system of the imaging lens.

The conditional expression (10) defines an appropriate range of the focal length of the third lens to the focal length of the overall optical system of the imaging lens, and is a condition for correcting the astigmatic difference and the spherical aberration, while maintaining the low-profileness of the imaging lens. If the value is above the lower limit, the positive refractive power of the third lens is suppressed not to be so large, and the spherical aberration can be properly corrected. Furthermore, increase of the astigmatic difference is suppressed.

(xiv) According to the imaging lens having the above structure, it is preferable to satisfy a below conditional expression (11):

$$0.5 < f4/f < 10.0 \qquad (11)$$

where
f4: focal length of the fourth lens, and
f: focal length of the overall optical system of the imaging lens.

The conditional expression (11) defines an appropriate range of the focal length of the third lens to the focal length of the overall optical system of the imaging lens, and is a condition for the low-profileness and proper correction of the various aberrations, while securing back focus. If the value is below the upper limit, the positive refractive power of the fourth lens is suppressed not to be so small, it is also suppressed that a position of principal point on the image side of the imaging lens moves toward the image side to the object side, and the low-profileness is facilitated while securing appropriate back focus. On the other hand, if the value is above the lower limit, the positive refractive power of the fourth lens not to be so large, it is also suppressed that a position of principal point on the image side moves toward the image side, and the low-profileness is facilitated while securing appropriate back focus. Furthermore, balance is made in a scope of the conditional expression (11), and occurrence of the spherical aberration and the coma aberration is suppressed.

(xv) According to the imaging lens having the above structure, it is preferable to satisfy a below conditional expression (12):

$$-2.5 < f6/f < -0.5 \qquad (12)$$

where
f6: focal length of the sixth lens, and
f: focal length of the overall optical system of the imaging lens.

The conditional expression (12) defines an appropriate range of the focal length of the sixth lens to the focal length of the overall optical system of the imaging lens, and is a condition for the low-profileness and proper correction of the various aberrations. If the value is below the upper limit, the negative refractive power of the sixth lens is suppressed not to be so large, and the low-profileness is facilitated. On the other hand, if the value is above the lower limit, the negative refractive power of the sixth lens is suppressed not to be so small, and the distortion and the field curvature are properly corrected.

(xvi) According to the imaging lens having the above structure, it is preferable to satisfy a below conditional expression (13):

$$0.07 < r1/r2 < 0.35 \qquad (13)$$

where
r1: curvature radius of the object-side surface of the first lens, and
r2: curvature radius of the image-side surface of the first lens.

The conditional expression (13) defines a shape of the first lens near the optical axis, and is a condition for the proper correction of the spherical aberration while providing the low-proneness. If the value is below the upper limit, the refractive power on the object-side surface of the first lens is suppressed not to be so small, and the low-profileness is facilitated. On the other hand, if the value is above the lower limit, the refractive power on the object-side surface of the first lens is suppressed not to be so large, and the correction of the spherical aberration is facilitated.

(xvii) According to the imaging lens having the above structure, it is preferable to satisfy a below conditional expression (14):

$$0.8 < r7/r8 < 3.5 \quad (14)$$

where r7: curvature radius of the object-side surface of the fourth lens, and
r8: curvature radius of the image-side surface of the fourth lens.

The conditional expression (14) defines a shape of the fourth lens near the optical axis, and is a condition for the proper correction of the various aberrations. If the conditional expression (14) is satisfied, corrections of the coma aberration and the field curvature in the peripheral area are facilitated, and increase of the astigmatism is suppressed.

(xviii) According to the imaging lens having the above structure, it is preferable to satisfy a below conditional expression (15):

$$1.5 < r11/r12 < 4.0 \quad (15)$$

where r11: curvature radius of the object-side surface of the sixth lens, and
r12: curvature radius of the image-side surface of the sixth lens.

The conditional expression (15) defines an appropriate range of a shape of the sixth lens near the optical axis. If the conditional expression (15) is satisfied, the low-profileness, and the correction of the astigmatism and the field curvature are facilitated while securing the appropriate back focus.

(xix) According to the imaging lens having the above structure, it is preferable to satisfy below conditional expressions (16) and (17):

$$30 < vd1 - vd2 \quad (16)$$

$$30 < |vd3 - vd4| \quad (17)$$

where vd1: Abbe number of the first lens at d-ray,
vd2: Abbe number of the second lens at d-ray,
vd3: Abbe number of the third lens at d-ray, and
vd4: Abbe number of the fourth lens at d-ray.

The conditional expression (16) defines an appropriate range of relationship of the abbe numbers of the first lens and the second lens at d-ray. If the value is above the lower limit of the conditional expression (16), it becomes possible to properly correct the chromatic aberration.

The conditional expression (17) defines an appropriate range of relationship of the abbe numbers of the third lens and the fourth lens at d-ray. If the value is above the lower limit of the conditional expression (17), it becomes possible to properly correct the chromatic aberration.

If the conditional expressions (16) and (17) are satisfied at the same time, it becomes possible to properly correct the chromatic aberration.

(xx) According to the imaging lens having the above structure, it is preferable to satisfy a below conditional expression (18):

$$0.4 < |r7|/f < 1.5 \quad (18)$$

where r7: curvature radius of the object-side surface of the fourth lens, and
f: focal length of the overall optical system of the imaging lens.

The conditional expression (18) defines a shape of the object-side surface of the fourth lens near the optical axis. If the conditional expression (18) is satisfied, an angle of the light ray in a position off the optical axis which is incident on the surface is suppressed not to be large, and occurrence of the aberration on the surface can be suppressed. Furthermore, if the conditional expression (18) is satisfied, a proper distance between the third lens and the fourth lens can be maintained.

(xxi) According to the imaging lens having the above structure, it is preferable that an aperture stop is located at the object side of the first lens.

If the aperture stop is located at the object side of the first lens, an entrance pupil position goes away from the image surface, and control of an angle of light ray incident to the image sensor and control of telecentricity are facilitated.

DETAILED DESCRIPTION OF THE PREFERRED EMBODIMENT

Hereinafter, the preferred embodiment of the present invention will be described in detail referring to the accompanying drawings. FIGS. 1, 3, 5 7 and 9 are schematic views showing the general configurations of the imaging lenses in Examples 1 to 5 according to the embodiments of the present invention, respectively. Since all these examples have the same basic lens configuration, the general configuration of an imaging lens according to this embodiment is explained below mainly referring to the schematic view of Example 1.

Figure 1:
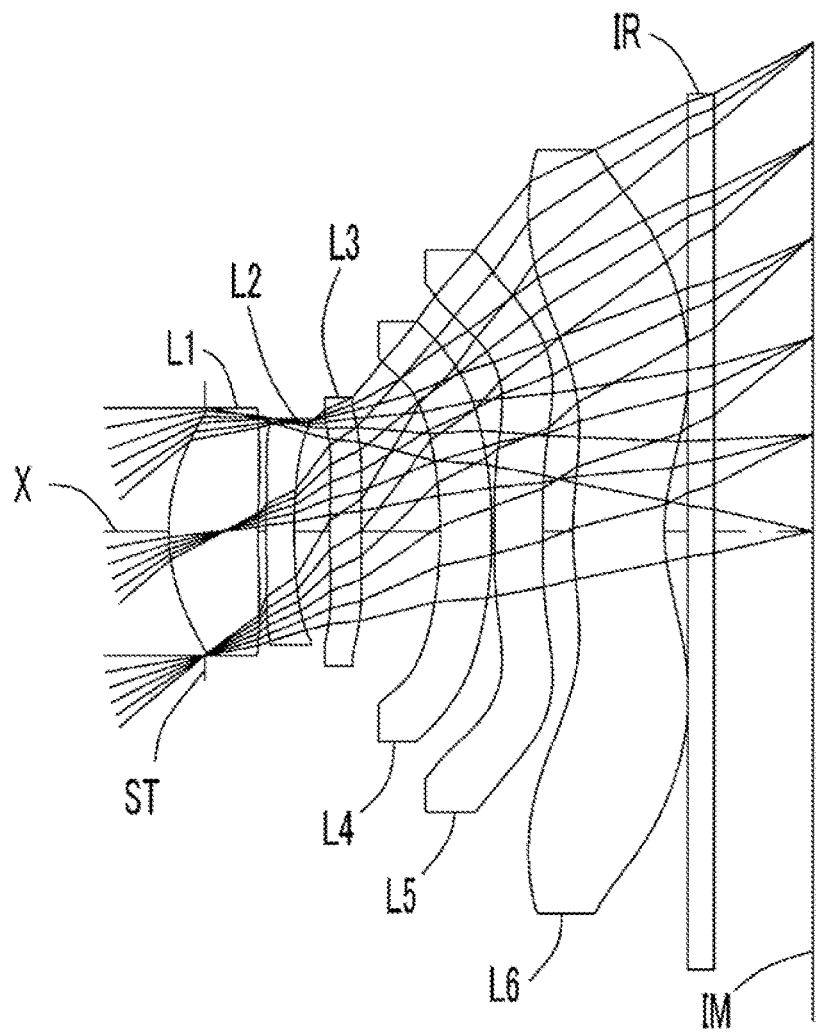
FIG. 1 is a schematic view showing a general configuration of an imaging lens in Example 1 according to the present invention.

As shown in FIG. 1, the imaging lens according to this embodiment is an imaging lens which forms an image of an object on an image sensor, and comprises in order from an object side to an image side, a first lens L1 having positive refractive power and a convex surface facing the object side near an optical axis X, a second lens L2 having negative refractive power and a concave surface facing the image side near the optical axis X, a third lens L3 having positive refractive power and a concave surface facing the image side near the optical axis X as a double-sided aspheric lens, a fourth lens L4 having a meniscus shape with positive refractive power and a concave surface facing the object side near the optical axis, a fifth lens L5 as a double-sided aspheric lens, and a sixth lens L6 having negative refractive power and a concave surface facing the image side near the optical axis X as a double-sided aspheric lens.

A filter IR such as an IR cut filter and a cover glass is located between the sixth lens L6 and an image plane IM, namely the image plane of the imaging sensor". The filter IR is omissible. An image-forming position of an optical system varies depending on thickness of the filter IR. For example, a distance in an optical axis direction according to the present invention, such as total track length is defined as a distance which thickness of the IR cut filter or the cover glass located between the sixth lens and the imaging plane IM is regarded as an air.

The imaging lens according to the present embodiment comprises in order from an object side to an image side, a lens group of the first lens L1 and the second lens L2 having the positive composite refractive power, the third lens L3 having positive refractive power, and a lens group of the fourth lens L4, the fifth lens L5 and the sixth lens L6 having the negative composite refractive power, and the total track length is made small in length. Such configuration is only one example, and other configurations may be applicable within a scope and an object of the present invention. For example, in an example 5 in FIG. 4, configuration is made by comprising in order from the object side, a lens group of the first lens L1 and the second lens L2 having the positive composite refractive power, the third lens L3 having the positive refractive power, and a lens group of the fourth lens L4, the fifth lens L5 and the sixth lens L6 having positive composite refractive power.

Due to the lens group of the first lens L1 and the second lens L2 having the positive composite refractive power, there can be provided low-profileness of the imaging lens, wide field of view and proper correction of chromatic aberration.

The first lens L1 is a meniscus lens and its image-side surface is concave near the optical axis. The first lens L1 has the strongest positive refractive power among the six lenses of the imaging lens. Thereby, the low-profileness and the wide field of view are provided.

The second lens L2 is a meniscus lens having a concave surface facing the image side near the optical axis. The second lens L2 properly corrects spherical aberration and chromatic aberration occurred at the first lens L1. Regarding a shape of the second lens L2, it may only have a concave surface facing the image side near the optical axis. As shown in an example 4 in FIG. 7, the object-side surface and the image-side surface may be concave, namely, the second lens L2 may be biconcave near the optical axis X.

The third lens L3 is a meniscus lens having a concave surface facing the image side near the optical axis X. The third lens L3 is a double-sided aspheric lens, and corrects an axial chromatic aberration, high-order spherical aberration and coma aberration, and field curvature.

A lens group of the fourth lens L4, the fifth lens L5 and the sixth lens L6 having negative composite refractive power corrects various aberrations in a position off the optical axis while maintaining the low-profileness.

The fourth lens L4 is a meniscus lens having a concave surface facing the object side near the optical axis X. The fourth lens L4 corrects the axial chromatic aberration, the high-order spherical aberration and coma aberration, and the field curvature. Additionally, the fourth lens L4 has proper positive refractive power and maintains the low-profileness.

The fifth lens L5 has plane object-side surface and image-side surface near the optical axis X, and has no substantive refractive power. The fifth lens L5 is the double-sided aspheric lens, formed to help correction of field curvature and distortion, and control of an angle of light ray incident to an image sensor which the sixth lens carries out. Regarding a shape of the fifth lens L5, the fifth lens L5 may have various options of shapes, such as, near the optical axis X, the meniscus shape with a convex surface facing the object side, biconvex shape with the convex surfaces facing the object side and the image side, the meniscus shape with a concave surface facing the object side, biconcave shape with concave surfaces facing the object side and the image side, a shape that the object-side surface is plane and the image-side surface is convex or concave, a shape that the image-side surface is plane and the object-side is convex or concave, and so on. In an example 5 in FIG. 9, the fifth lens L5 is biconcave near the optical axis X.

The sixth lens L6 is a meniscus lens having the concave surface facing the image side near the optical axis X. The sixth lens L6 secures back focus while maintaining the low-profileness. Also, the sixth lens L6 is the double-sided aspheric lens, and carries out the correction of field curvature and distortion, and control of an angle of light ray incident to the image sensor, and the image-side surface near the optical axis X is the concave surface, and varies to the convex surface in a position off the optical axis X. Also, the object-side surface is convex near the optical axis X and varies to the concave surface in a position off the optical axis X, and further varies to the convex surface in a peripheral area of an effective diameter. The object-side surface of the sixth lens L6 is not limited to the convex surface near the optical axis X, and may have the concave surface.

The imaging lens according to the present embodiment satisfies a below conditional expression (1) and the low-profileness is provided:

$$0.6<\Sigma d/f<1.0 \tag{1}$$

where
$\Sigma d$: distance along the optical axis X from the object-side surface of the first lens L1 to the image-side surface of the sixth lens L6, and
f: the focal length of the overall optical system of the imaging lens.

Regarding the conditional expression (1), a below conditional expression (1a) is a more preferable condition, and a conditional expression (1b) is the most preferable.

$$0.7<\Sigma d/f<1.0 \tag{1a}$$

$$0.8<\Sigma d/f<0.95 \tag{1b}$$

The imaging lens according to the present embodiment satisfies a below conditional expression (2), and there are suppressed increase in distortion and astigmatic difference, a proper distance between the first lens L1 and the second lens L2 is provided:

$$0.5<(T1/f)*100<2.0 \tag{2}$$

where
T1: distance along the optical axis X from the image-side surface of the first lens L1 to the object-side surface of the second lens L2, and f: the focal length of the overall optical system of the imaging lens.

Regarding the conditional expression (2), a below conditional expression (2a) is a more preferable condition, and a conditional expression (2b) is the most preferable.

$$0.8 < (T1/f)*100 \leq 1.8 \tag{2a}$$

$$0.9 \leq (T1/f)*100 \leq 1.5 \tag{2b}$$

In the imaging lens according to the present embodiment, an aperture stop ST is located between a vertex of the object-side surface of the first lens L1 and the peripheral area of the surface. Therefore, total track length (TTL) is equivalent to a distance on the optical axis X from the first lens L1 to the image plane IM. In comparison with the optical system in which the aperture stop ST is located at a position separated toward the object side from the vertex of the surface of the first lens L1, the imaging lens according to the present embodiment contributes to the low-profileness. Due to such configuration, control of telecentricity is facilitated.

The imaging lens according to the present embodiment satisfies a below conditional expression (3), and there are provided correction of the axial chromatic aberration, suppression of occurrence of the coma aberration, and reduction in sensitivity to manufacture error:

$$0.5 < r4/f < 1.5 \tag{3}$$

where
r4: curvature radius of the image-side surface of the second lens L2, and
f: the focal length of the overall optical system of the imaging lens.

Regarding the conditional expression (3), a below conditional expression (3a) is a more preferable condition, and a conditional expression (3b) is the most preferable.

$$0.5 < r4/f < 1.4 \tag{3a}$$

$$0.6 \leq r4/f \leq 1.3 \tag{3b}$$

In the imaging lens according to the present embodiment, a refractive index of the second lens L2 at d-ray is more than 1.64 and less than 1.70, and the spherical aberration and the chromatic aberration are properly corrected.

In the imaging lens according to the present embodiment, a refractive index of the fourth lens L4 at d-ray is also more than 1.64 and less than 1.70, and the aberration correction of the lens is facilitated while maintaining the low-profileness.

Figure 3:
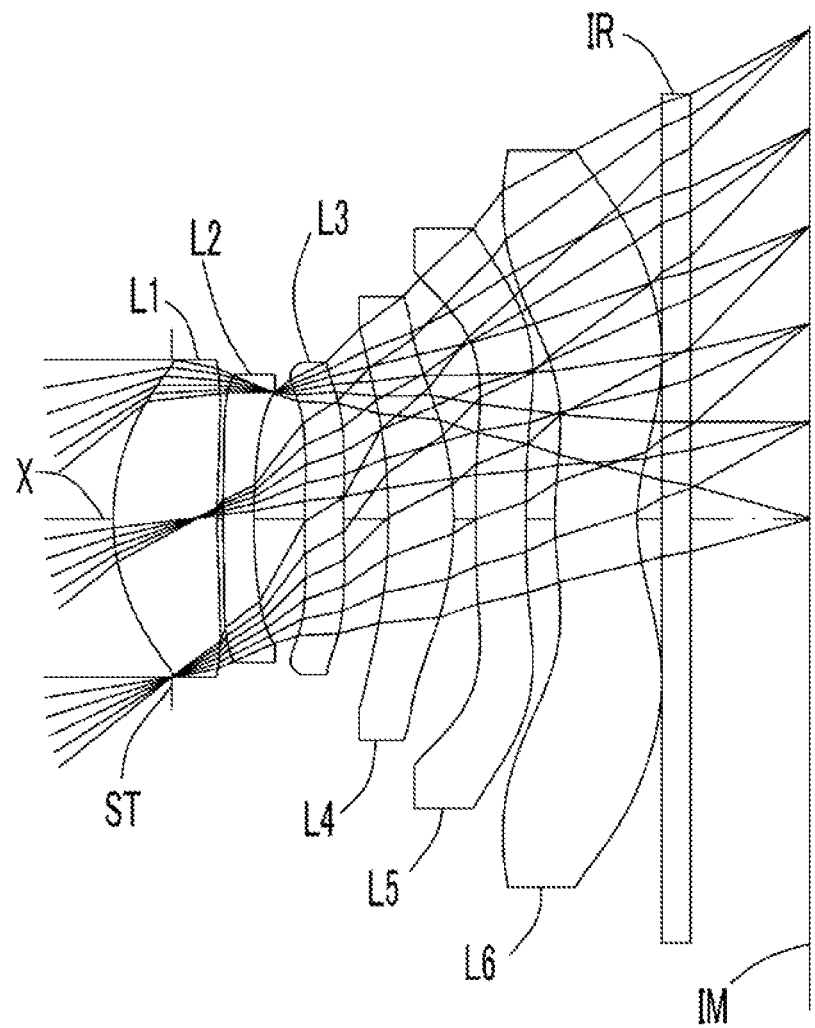
FIG. 3 is a schematic view showing the general configuration of an imaging lens in Example 2 according to the present invention.
Figure 5:
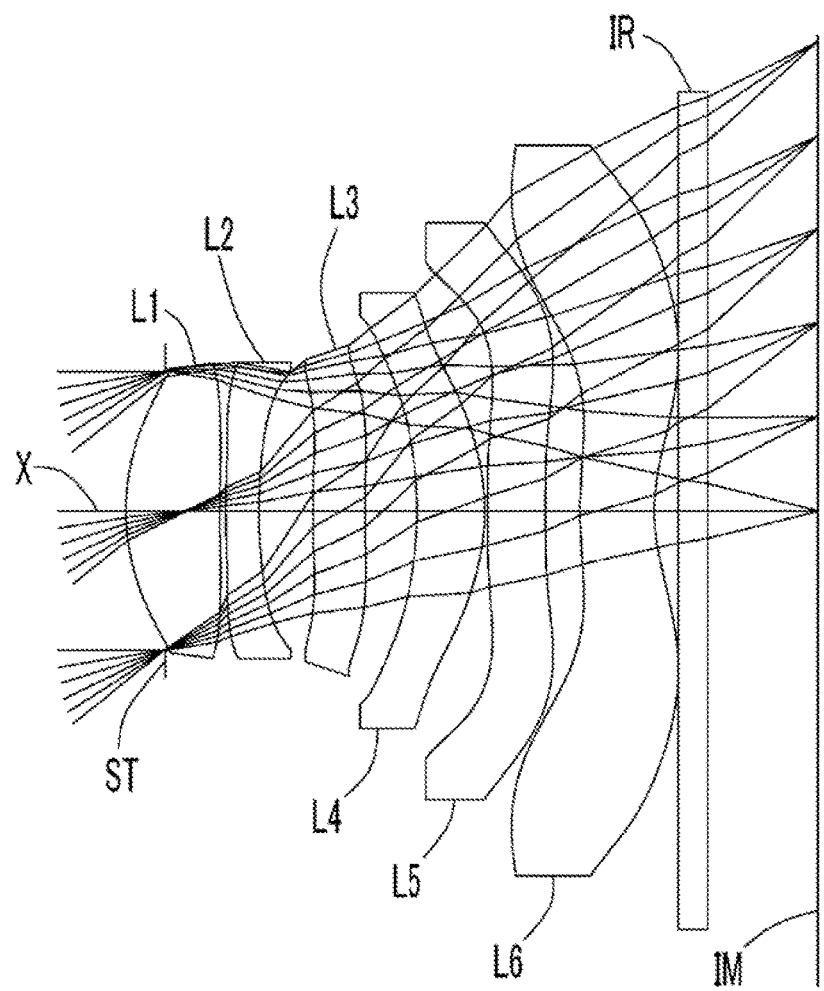
FIG. 5 is a schematic view showing the general configuration of an imaging lens in Example 3 according to the present invention.
Figure 7:
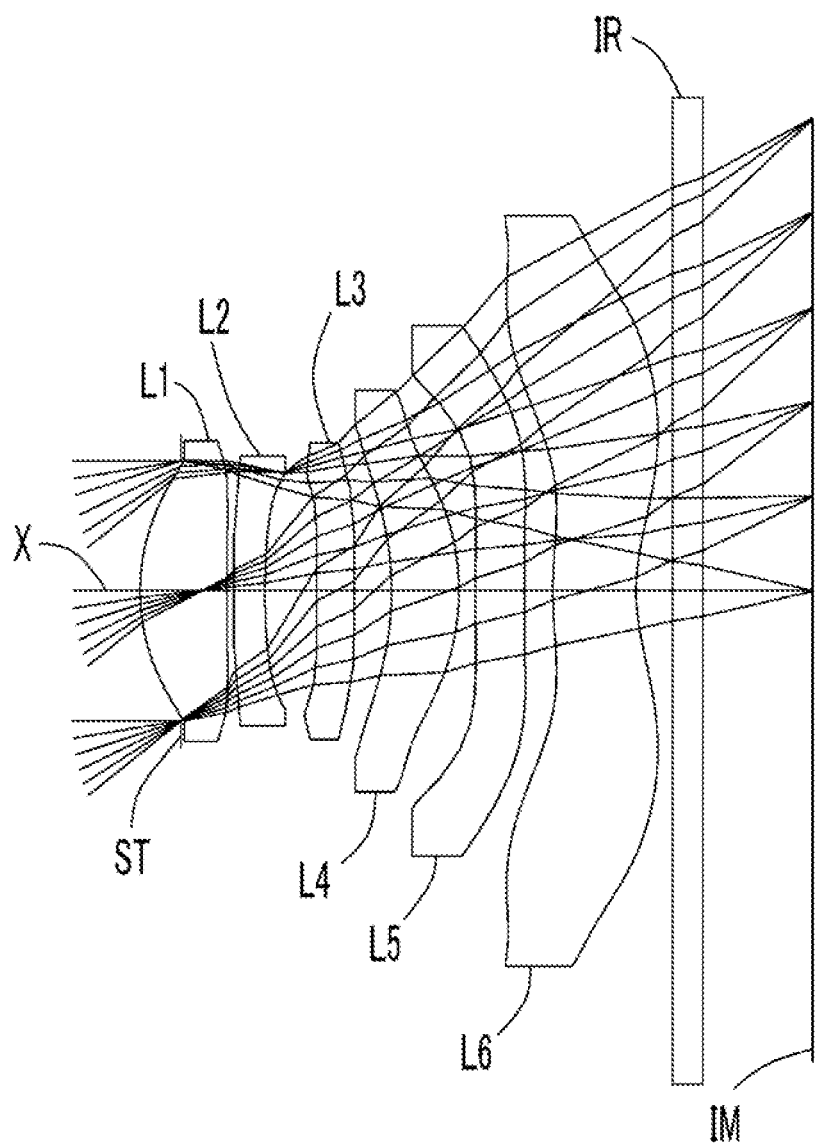
FIG. 7 is a schematic view showing the general configuration of an imaging lens in Example 4 according to the present invention.

The refractive indexes of the second lens L2, the third lens L3, and the fifth lens L5 at d-ray in Example 2 in FIG. 3, the refractive indexes of second lens L2 and the fifth lens L5 at d-ray in Example 3 in FIG. 5, and the second lens L2, the third lens L3 and the fifth lens L5 at d-ray in Example 3 in FIG. 7 are more than 1.64 and less than 1.70, respectively.

The imaging lens according to the present embodiment satisfies a below conditional expression (4), and the imaging lens fully low-profiled can be obtained:

$$TTL/2ih \leq 0.8 \tag{4}$$

where
TTL: distance along the optical axis from the object-side surface of the first lens L1 to the image plane, namely total track length, and
ih: maximum image height.

The imaging lens according to the present embodiment satisfies a below conditional expression (5), and below distances are appropriately defined and there are provided the proper low-profileness and the aberration correction:

$$0.4 < T2/T3 < 1.5 \tag{5}$$

where
T2: distance along the optical axis from the image-side surface of the second lens L2 to the object-side surface of the third lens L3, and
T3: distance from the image-side surface of the third lens L3 to the object-side surface of the fourth lens L4.

Regarding the conditional expression (5), a below conditional expression (5a) is a more preferable.

$$0.44 \leq T2/T3 \leq 1.36 \tag{5a}$$

The imaging lens according to the present embodiment satisfies below conditional expressions (6) and (7), a distance between fourth lens L4 and the fifth lens L5, and a distance between the fifth lens L5 and the sixth lens L6 are made suitable for the low-profileness:

$$0.2 < (T4/f)*100 < 4.0 \tag{6}$$

$$2.0 < (T5/f)*100 < 8.0 \tag{7}$$

where
T4: distance along the optical axis from the image-side surface of the fourth lens L4 to the object-side surface of the fifth lens L5,
T5: distance from the image-side surface of the fifth lens L5 to the object-side surface of the sixth lens L6, and
f: focal length of the overall optical system of the imaging lens.

Regarding the conditional expressions (6) and (7), below conditional expressions (6a) and (7a) are more preferable, respectively.

$$0.4 \leq (T4/f)*100 < 3.8 \tag{6a}$$

$$3.0 \leq (T5/f)*100 < 6.0 \tag{7a}$$

The imaging lens according to the present embodiment satisfies a below conditional expression (8), and the chromatic aberration, the astigmatism and the field curvature are suppressed in a preferable range:

$$-0.7 < f1/f2 < -0.15 \tag{8}$$

where
f1: focal length of the first lens L1, and
f2: focal length of the second lens L2.

Regarding the conditional expression (8), a below conditional expression (8a) is more preferable.

$$-0.45 \leq f1/f2 \leq -0.25 \tag{8a}$$

The imaging lens according to the present embodiment satisfies a below conditional expression (9), and there are provided the low-profileness of the imaging lens and proper correction of the chromatic aberration:

$$-4.5 < f2/f < -1.2 \tag{9}$$

where
f2: focal length of the second lens L2, and
f: focal length of the overall optical system of the imaging lens.

Regarding the conditional expression (9), a below conditional expression (9a) is more preferable.

$$-3.5 \leq f2/f \leq -1.5 \tag{9a}$$

The imaging lens according to the present embodiment satisfies a below conditional expression (10), and the astigmatic difference and the spherical aberration are properly corrected while maintaining the low-profileness of the imaging lens:

$$3.0 < f3/f \tag{10}$$

where
f3: focal length of the third lens L3, and
f: focal length of the overall optical system of the imaging lens.

Regarding the conditional expression (10), a below conditional expression (10a) is more preferable.

$$4.5 \leq f3/f \leq 20.0 \tag{10a}$$

The imaging lens according to the present embodiment satisfies a below conditional expression (11), and there are provided the low-profileness and proper correction of the various aberrations while maintaining the back focus:

$$0.5 < f4/f < 10.0 \tag{11}$$

where
f4: focal length of the fourth lens L4, and
f: focal length of the overall optical system of the imaging lens.

Regarding the conditional expression (11), a below conditional expression (11a) is more preferable.

$$0.6 \leq f4/f \leq 8.0 \tag{11a}$$

The imaging lens according to the present embodiment satisfies a below conditional expression (12), and the distortion and the field curvature are properly corrected:

$$-2.5 < f6/f < -0.5 \tag{12}$$

where
f6: focal length of the sixth lens L6.

Regarding the conditional expression (12), a below conditional expression (12a) is more preferable.

$$-2.0 \leq f6/f \leq -0.6 \tag{12}$$

The imaging lens according to the present embodiment satisfies a below conditional expression (13), and occurrence of the spherical aberration is suppressed while providing the low-profileness;

$$0.07 < r1/r2 < 0.35 \tag{13}$$

where
r1: curvature radius of the object-side surface of the first lens L1, and
r2: curvature radius of the image-side surface of the first lens L1.

The imaging lens according to the present embodiment satisfies a below conditional expression (14), and the coma aberration in the peripheral area and the field curvature are properly corrected, and increase in astigmatism is suppressed:

$$0.8 < r7/r8 < 3.5 \tag{14}$$

where
r7: curvature radius of the object-side surface of the fourth lens L4, and
r8: curvature radius of the image-side surface of the fourth lens L4.

Regarding the conditional expression (14), a below conditional expression (14a) is more preferable.

$$1.0 \leq r7/r8 \leq 3.2 \tag{14a}$$

The imaging lens according to the present embodiment satisfies a below conditional expression (15), and the low-profileness is facilitated and correction of the astigmatism and the field curvature is also facilitated while securing an appropriate back focus:

$$1.5 < r11/r12 < 4.0 \tag{15}$$

where
r11: curvature radius of the object-side surface of the sixth lens L6, and
r12: curvature radius of the image-side surface of the sixth lens L6.

Regarding the conditional expression (15), a below conditional expression (15a) is more preferable.

$$1.8 \leq r11/r12 \leq 3.0 \tag{15}$$

The imaging lens according to the present embodiment satisfies below conditional expressions (16) and (17), and proper correction of the chromatic aberration is provided:

$$30 < vd1 - vd2 \tag{16}$$

$$30 < |vd3 - vd4| \tag{17}$$

where
vd1: Abbe number of the first lens L1 at d-ray,
vd2: Abbe number of the second lens L2 at d-ray,
vd3: Abbe number of the third lens L3 at d-ray, and
vd4: Abbe number of the fourth lens L4 at d-ray.

The imaging lens according to the present embodiment satisfies a below conditional expression (18), and an angle of the light ray in a position off the optical axis is suppressed not to be large, and occurrence of the aberration on the surface can be suppressed:

$$0.4 < |r7|/f < 1.5 \tag{18}$$

where
r7: curvature radius of the object-side surface of the fourth lens L4.

In the imaging lens according to the present embodiment, it is preferable to satisfy all of conditional expressions. By satisfying the conditional expression individually, operational advantage corresponding to each conditional expression can be obtained.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} A_{12} H^{12} + A_{14} H^{14} + A_{16} H^{16} \qquad \text{Equation 1}$$

Next, examples of the imaging lens according to this embodiment will be explained. In each example, f denotes the focal length of the overall optical system of the imaging lens, Fno denotes an F-number, w denotes a half field of view, ih denotes a maximum image height, and TTL denotes a distance along the optical axis from the object-side surface of the first lens L1 to the image plane IM. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

EXAMPLE 1

The basic lens data of Example 1 is shown below in Table 1.

The spherical aberration diagram shows the amount of aberration at wavelengths of F-ray (486 nm), d-ray (588 nm), and C-ray (656 nm). The astigmatism diagram shows

TABLE 1

Numerical Data Example 1
Unit mm
f = 4.61
ih = 3.74
Fno = 2.3
TTL = 5.13
ω(°) = 38.6

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.29000 | | |
| 2* | 1.62322 | 0.72000 | 1.548 | 55.57 |
| 3* | 8.60739 | 0.06476 | | |
| 4* | 16.40344 | 0.22500 | 1.661 | 20.37 |
| 5* | 4.10999 | 0.28500 | | |
| 6* | 6.73431 | 0.25605 | 1.535 | 55.66 |
| 7* | 16.61320 | 0.64328 | | |
| 8* | −4.37335 | 0.41925 | 1.661 | 20.37 |
| 9* | −3.81566 | 0.02000 | | |
| 10* | Infinity | 0.39000 | 1.535 | 55.66 |
| 11* | Infinity | 0.24250 | | |
| 12* | 3.11562 | 0.73612 | 1.535 | 55.66 |
| 13* | 1.63700 | 0.30000 | | |
| 14 | Infinity | 0.21000 | 1.517 | 64.20 |
| 15 | Infinity | 0.69314 | | |
| Image Plane | Infinity | | | |

Constituent Lens Data

| Lens | Start Surface | Focal Length | Lens | Composite Focal Length |
|---|---|---|---|---|
| 1 | 2 | 3.550 | 1, 2 | 5.290 |
| 2 | 4 | −8.355 | 4, 5, 6 | −10.211 |
| 3 | 6 | 20.986 | | |
| 4 | 8 | 34.833 | | |
| 5 | 10 | Infinity | | |
| 6 | 12 | −7.803 | | |

Aspheric Surface Data

| | Second Surface | Third Surface | Fourth Surface | Fifth Surface | Sixth Surface | Seventh Surface |
|---|---|---|---|---|---|---|
| k | −6.935686E−02 | 0.000000E+00 | 0.000000E+00 | 5.564858E+00 | −8.586935E+01 | 0.000000E+00 |
| A4 | −1.075443E−02 | −2.009206E−01 | −2.319826E−01 | −1.276763E−01 | −1.574337E−01 | −1.370216E−01 |
| A6 | 2.404084E−02 | 3.420964E−01 | 6.341226E−01 | 4.717057E−01 | 2.242865E−01 | 2.501055E−01 |
| A8 | −8.289718E−02 | −3.073441E−01 | −6.232426E−01 | −5.789828E−01 | −1.057775E+00 | −1.081052E+00 |
| A10 | 1.056228E−01 | 8.489774E−02 | 2.309015E−01 | 4.167214E−01 | 2.793823E+00 | 2.379325E+00 |
| A12 | −8.332987E−02 | 3.721538E−02 | 1.068843E−01 | −1.021387E−01 | −4.184183E+00 | −2.869150E+00 |
| A14 | 2.275009E−02 | −2.292635E−02 | −8.192567E−02 | 1.142128E−02 | 3.287366E+00 | 1.806645E+00 |
| A16 | 0.000000E+00 | 0.000000E+00 | 0.000000E+00 | 0.000000E+00 | −1.003406E+00 | −4.472032E−01 |

| | Eighth Surface | Ninth Surface | Tenth Surface | Eleventh Surface | Twelfth Surface | Thirteenth Surface |
|---|---|---|---|---|---|---|
| k | −2.604004E+00 | −1.400707E−01 | 0.000000E+00 | 0.000000E+00 | −3.267145E−01 | −6.272371E+00 |
| A4 | −9.195137E−02 | −1.278364E−02 | 2.618433E−01 | 2.235555E−01 | −1.533974E−01 | −6.898616E−02 |
| A6 | 1.533313E−01 | 3.551446E−02 | −3.615656E−01 | −2.516895E−01 | 3.288428E−02 | 1.273369E−02 |
| A8 | −9.123291E−02 | −2.501535E−02 | 2.446099E−01 | 1.321398E−01 | −1.537857E−03 | −7.825509E−04 |
| A10 | −1.217005E−01 | −1.702280E−02 | −1.108312E−01 | −4.358857E−02 | −4.847041E−04 | −9.488539E−05 |
| A12 | 1.826897E−01 | 2.017306E−02 | 3.003335E−02 | 8.650515E−03 | 9.043436E−05 | 1.535803E−05 |
| A14 | −9.421453E−02 | −8.679602E−03 | −4.219625E−03 | −9.140254E−04 | −6.282404E−06 | −5.568213E−07 |
| A16 | 1.784456E−02 | 7.616528E−04 | 2.347361E−04 | 3.896800E−05 | 1.637203E−07 | 0.000000E+00 |

The imaging lens in Example 1 satisfies conditional expressions (1) to (18) as shown in Table 6.

Figure 2:
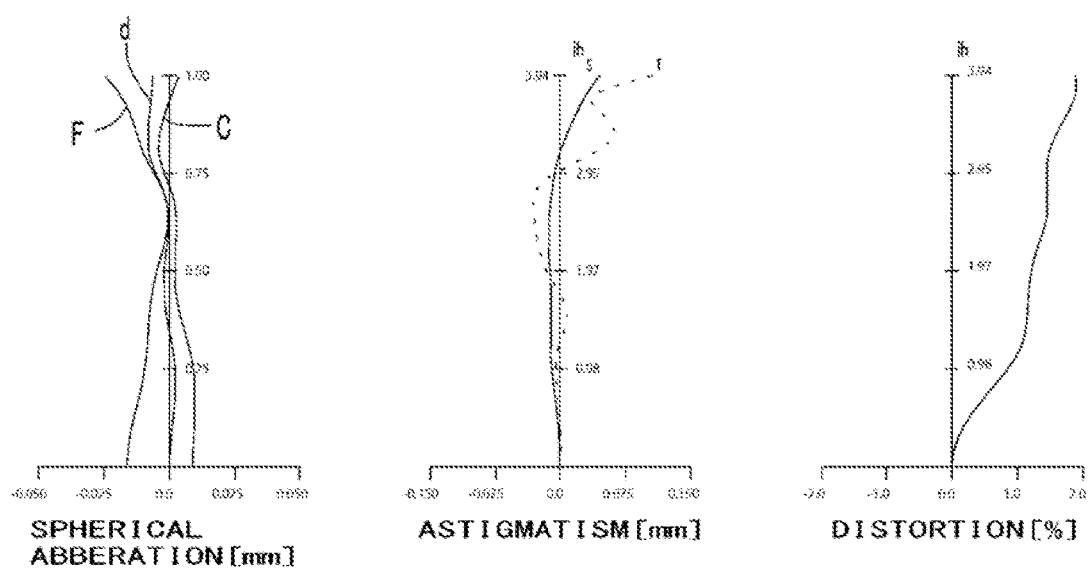
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1.

the amount of aberration at d-ray on a sagittal image surface S and on tangential image surface T (same as FIG. 4, FIG. 6, FIG. 8 and FIG. 10). As shown in FIG. 2, each aberration is corrected properly.

EXAMPLE 2

The basic lens data of Example 2 is shown below in Table 2.

TABLE 2

Numerical Data Example 2
Unit mm
f = 4.30
ih = 3.51
Fno = 1.9
TTL = 4.94
ω(°) = 38.7

Surfaces Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.41816 | | |
| 2* | 1.57262 | 0.74515 | 1.548 | 55.57 |
| 3* | 4.93610 | 0.04327 | | |
| 4* | 8.05647 | 0.22000 | 1.661 | 20.37 |
| 5* | 4.29851 | 0.36623 | | |
| 6* | 12.08809 | 0.27824 | 1.661 | 20.37 |
| 7* | 16.97514 | 0.32104 | | |
| 8* | −4.29501 | 0.47198 | 1.535 | 55.66 |
| 9* | −2.54093 | 0.16006 | | |
| 10* | Infinity | 0.36000 | 1.661 | 20.37 |
| 11* | Infinity | 0.20570 | | |
| 12* | 2.60706 | 0.58997 | 1.535 | 55.66 |
| 13* | 1.36463 | 0.30000 | | |
| 14 | Infinity | 0.21000 | 1.517 | 64.20 |
| 15 | Infinity | 0.73676 | | |
| Image Plane | Infinity | | | |

Constituent Lens Data

| Lens | Start Surface | Focal Length | Lens | Composite Focal Length |
|---|---|---|---|---|
| 1 | 2 | 3.933 | 1, 2 | 4.954 |
| 2 | 4 | −14.270 | 4, 5, 6 | −22.164 |
| 3 | 6 | 62.099 | | |
| 4 | 8 | 10.636 | | |
| 5 | 10 | Infinity | | |
| 6 | 12 | −6.416 | | |

Aspheric Surface Data

| | Second Surface | Third Surface | Fourth Surface | Fifth Surface | Sixth Surface | Seventh Surface |
|---|---|---|---|---|---|---|
| k | 6.079525E−02 | 0.000000E+00 | 0.000000E+00 | 9.418222E+00 | −2.260855E+01 | 0.000000E+00 |
| A4 | −5.779275E−03 | −2.425595E−01 | −2.618170E−01 | −7.716969E−02 | −1.338572E−01 | −1.254856E−01 |
| A6 | 9.004119E−03 | 3.261354E−01 | 5.559248E−01 | 2.831776E−01 | −9.743204E−03 | 1.264685E−01 |
| A8 | −2.841852E−02 | −2.428905E−01 | −5.373126E−01 | −1.688735E−01 | −8.308054E−02 | −4.851125E−01 |
| A10 | 2.903236E−02 | 8.843742E−02 | 3.147971E−01 | −4.225146E−02 | 1.193297E−01 | 8.309675E−01 |
| A12 | −1.860993E−02 | −1.731142E−02 | −7.292727E−02 | 1.266982E−01 | −1.314535E−01 | −8.327386E−01 |
| A14 | 0.000000E+00 | 0.000000E+00 | 0.000000E+00 | 0.000000E+00 | 8.206725E−02 | 4.692771E−01 |
| A16 | 0.000000E+00 | 0.000000E+00 | 0.000000E+00 | 0.000000E+00 | 1.547658E−02 | −1.044051E−01 |

| | Eighth Surface | Ninth Surface | Tenth Surface | Eleventh Surface | Twelfth Surface | Thirteenth Surface |
|---|---|---|---|---|---|---|
| k | 4.029325E+00 | −1.228683E+00 | 0.000000E+00 | 0.000000E+00 | −5.965581E−01 | −5.879725E+00 |
| A4 | −5.993155E−02 | −2.852613E−02 | 2.059285E−01 | 2.137125E−01 | −2.640991E−01 | −1.192080E−01 |
| A6 | 2.209759E−01 | 5.492611E−02 | −3.100974E−01 | −2.904830E−01 | 8.067127E−02 | 4.304709E−02 |
| A8 | −3.350820E−01 | −1.171161E−01 | 1.708845E−01 | 1.740389E−01 | −7.482298E−03 | −1.198369E−02 |
| A10 | 2.583907E−01 | 1.443013E−01 | −4.488904E−02 | −6.282073E−02 | −1.021806E−03 | 2.563637E−03 |
| A12 | −8.921496E−02 | −7.767454E−02 | 7.223879E−04 | 1.356778E−02 | 2.969049E−04 | −3.743860E−04 |
| A14 | 8.086776E−03 | 1.887293E−02 | 2.078692E−03 | −1.584203E−03 | −2.490563E−05 | 3.083213E−05 |
| A16 | 1.099422E−03 | −1.725832E−03 | −2.888518E−04 | 7.626639E−05 | 7.166834E−07 | −1.036559E−06 |

The imaging lens in Example 2 satisfies conditional expressions (1) to (18) as shown in Table 6.

Figure 4:
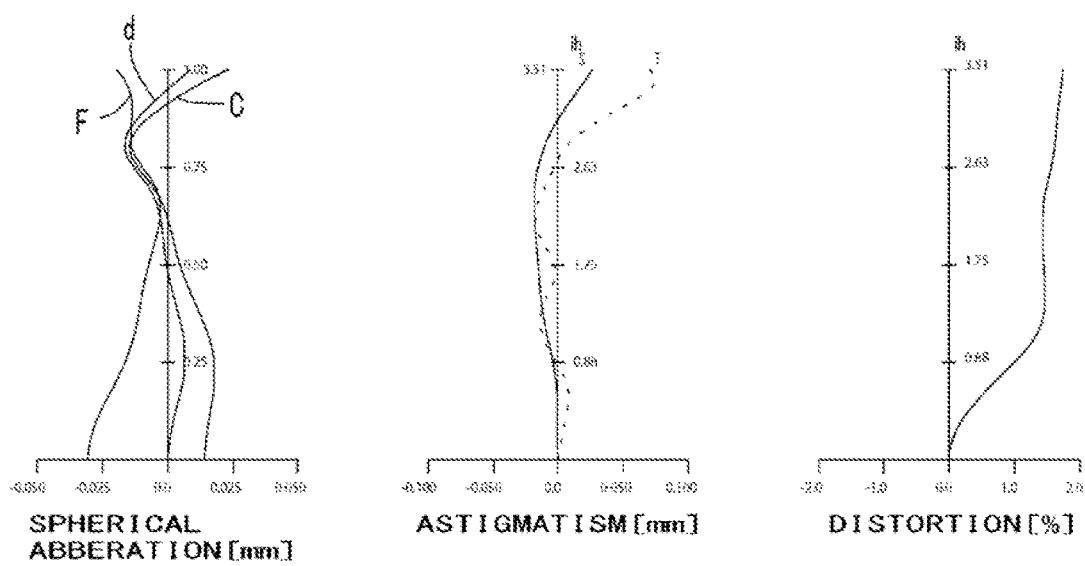
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected properly.

EXAMPLE 3

The basic lens data of Example 3 is shown below in Table 3.

TABLE 3

Numerical Data Example 3
Unit mm
f = 4.04
ih = 3.26
Fno = 2.1
TTL = 4.74
ω(°) = 38.5

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.27000 | | |
| 2* | 1.58500 | 0.64829 | 1.548 | 55.57 |
| 3* | 5.79685 | 0.04354 | | |
| 4* | 5.62707 | 0.22800 | 1.661 | 20.37 |
| 5* | 3.31593 | 0.37372 | | |
| 6* | 6.48151 | 0.36035 | 1.535 | 55.66 |
| 7* | 11.92532 | 0.36680 | | |
| 8* | −2.70723 | 0.46994 | 1.535 | 55.66 |
| 9* | −1.60204 | 0.02000 | | |
| 10* | Infinity | 0.40143 | 1.661 | 20.37 |
| 11* | Infinity | 0.23914 | | |
| 12* | 3.56715 | 0.51206 | 1.535 | 55.66 |
| 13* | 1.29781 | 0.20000 | | |
| 14 | Infinity | 0.21000 | 1.517 | 64.20 |
| 15 | Infinity | 0.73341 | | |
| Image Plans | Infinity | | | |

Constituent Lens Data

| Lens | Start Surface | Focal Length | Lens | Composite Focal Length |
|---|---|---|---|---|
| 1 | 2 | 3.802 | 1, 2 | 4.906 |
| 2 | 4 | −12.710 | 4, 5, 6 | −16.880 |
| 3 | 6 | 25.950 | | |
| 4 | 8 | 6.391 | | |
| 5 | 10 | Infinity | | |
| 6 | 12 | −4.140 | | |

Aspheric Surface Data

| | Second Surface | Third Surface | Fourth Surface | Fifth Surface | Sixth Surface | Seventh Surface |
|---|---|---|---|---|---|---|
| k | −4.186112E−02 | 0.000000E+00 | 0.000000E+00 | 2.692548E+00 | −2.278622E+01 | 0.000000E+00 |
| A4 | −5.763220E−03 | −3.929316E−01 | −4.419358E−01 | −1.624167E−01 | −1.351151E−01 | −9.527946E−02 |
| A6 | −2.672447E−03 | 7.598335E−01 | 1.073598E+00 | 5.073494E−01 | −1.319718E−01 | −1.124166E−01 |
| A8 | −2.845398E−02 | −7.917816E−01 | −1.142317E+00 | −5.203484E−01 | 4.332744E−01 | 1.863100E−01 |
| A10 | 2.699524E−02 | 3.457254E−01 | 6.012876E−01 | 3.051486E−01 | −7.443387E−01 | −2.425444E−01 |
| A12 | −3.056750E−02 | −4.841825E−02 | −1.078655E−01 | −3.467813E−02 | 6.188508E−01 | 1.717888E−01 |
| A14 | 0.000000E+00 | 0.000000E+00 | 0.000000E+00 | 0.000000E+00 | −1.627232E−01 | −3.471280E−02 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 1.235409E+00 | −1.790604E+00 | 0.000000E+00 | 0.000000E+00 | 1.492406E−01 | −5.984861E+00 |
| A4 | −6.981845E−02 | 3.307993E−02 | 2.587836E−01 | 2.679405E−01 | −2.097243E−01 | −1.295687E−01 |
| A6 | 2.818156E−01 | −3.772421E−03 | −4.226901E−01 | −3.988646E−01 | 1.360395E−02 | 4.567583E−02 |
| A8 | −5.191439E−01 | −1.732586E−01 | 2.674038E−01 | 2.683288E−01 | 2.819196E−02 | −1.359176E−02 |
| A10 | 4.571964E−01 | 2.727359E−01 | −7.928832E−02 | −1.097681E−01 | −1.063559E−02 | 3.771600E−03 |
| A12 | −1.752398E−01 | −1.617803E−01 | 9.254363E−04 | 2.683413E−02 | 1.693992E−03 | −7.392429E−04 |
| A14 | 1.871747E−02 | 4.311316E−02 | 4.578216E−03 | −3.544283E−03 | −1.288808E−04 | 7.731902E−05 |
| A16 | 1.925167E−03 | −4.375018E−03 | −6.756438E−04 | 1.935440E−04 | 3.788195E−06 | −3.162844E−06 |

The imaging lens in Example 3 satisfies conditional expressions (1) to (16), and (18) as shown in Table 6.

Figure 6:
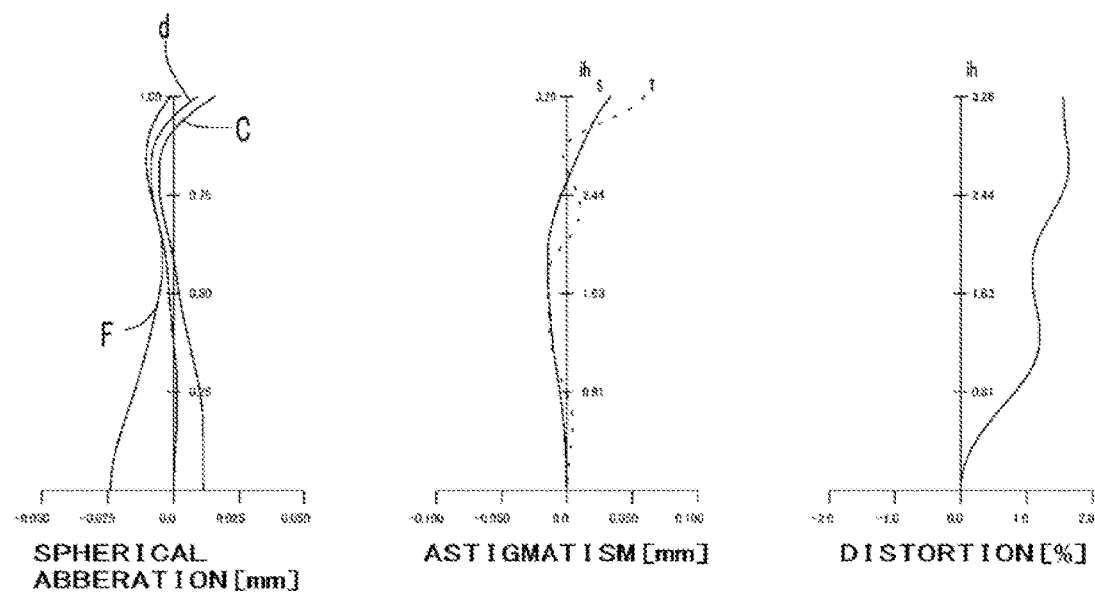
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected properly.

EXAMPLE 4

The basic lens data of Example 4 is shown below in Table 4,

TABLE 4

Numerical Data Example 4
Unit mm
f = 3.99
ih = 3.24
Fno = 2.2
TTL = 4.53
ω(°) = 39.0

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.2786 | | |
| 2* | 1.38911 | 0.5917 | 1.548 | 55.57 |
| 3* | 10.31379 | 0.0518 | | |
| 4* | −47.41683 | 0.2100 | 1.650 | 21.54 |
| 5* | 5.04123 | 0.3507 | | |
| 6* | 9.29253 | 0.2571 | 1.650 | 21.54 |
| 7* | 13.55295 | 0.2580 | | |
| 8* | −2.23711 | 0.4657 | 1.535 | 55.66 |
| 9* | −1.72033 | 0.1110 | | |
| 10* | Infinity | 0.3339 | 1.650 | 21.54 |
| 11* | Infinity | 0.1951 | | |
| 12* | 2.75347 | 0.5674 | 1.535 | 55.66 |
| 13* | 1.32600 | 0.5000 | | |
| 14 | Infinity | 0.2100 | 1.517 | 64.20 |
| 15 | Infinity | 0.5006 | | |
| Image Plane | Infinity | | | |

Constituent Lens Data

| Lens | Start Surface | Focal Length | Lens | Composite Focal Length |
|---|---|---|---|---|
| 1 | 2 | 2.882 | 1, 2 | 4.278 |
| 2 | 4 | −6.996 | 4, 5, 6 | −13.136 |
| 3 | 6 | 44.398 | | |
| 4 | 8 | 10.597 | | |
| 5 | 10 | Infinity | | |
| 6 | 12 | −5.551 | | |

Aspheric Surface Data

| | Second Surface | Third Surface | Fourth Surface | Fifth Surface | Sixth Surface | Seventh Surface |
|---|---|---|---|---|---|---|
| k | −1.967214E−03 | 0.000000E+00 | 0.000000E+00 | 9.185831E+00 | −2.261108E+01 | 0.000000E+00 |
| A4 | −1.230843E−02 | −1.492996E−01 | −1.096284E−01 | −2.076675E−02 | −2.749720E−01 | −2.337904E−01 |
| A6 | 5.316380E−02 | 1.755109E−01 | 4.521449E−01 | 5.239162E−01 | 5.317845E−01 | 4.240610E−01 |
| A8 | −2.070441E−01 | 5.469286E−02 | −3.273939E−01 | −1.172253E+00 | −2.772007E−00 | −1.630070E+00 |
| A10 | 2.846545E−01 | −4.001771E−01 | −2.444808E−02 | 2.191852E+00 | 7.686206E+00 | 3.513204E+00 |
| A12 | −2.062404E−01 | 1.660656E−01 | 7.727210E−02 | −2.343305E+00 | −1.253627E+01 | −4.552804E+00 |
| A14 | 0.000000E+00 | 4.978330E−02 | 6.390219E−02 | 1.260009E+00 | 1.086791E+01 | 3247415E+00 |
| A16 | 0.000000E+00 | 0.000000E+00 | 0.000000E+00 | 0.000000E+00 | −3.610737E+00 | −9.116352E−01 |

| | Eighth Surface | Ninth Surface | Tenth Surface | Eleventh Surface | Twelfth Surface | Thirteenth Surface |
|---|---|---|---|---|---|---|
| k | 1.346033E+00 | 2.810815E−01 | 0.000000E+00 | 0.000000E+00 | −3.290207E−01 | −6.502101E+00 |
| A4 | −7.577301E−02 | −1.068752E−01 | 9.006051E−02 | 1.212194E−01 | −3.832958E−01 | −1.596048E−01 |
| A6 | 3.267880E−01 | 2.522699E−01 | −2.875964E−01 | −2.831811E−01 | 2.009147E−01 | 7.691817E−02 |
| A8 | −4.330790E−01 | −3.581994E−01 | 1.758500E−01 | 1.998812E−01 | −5.709034E−02 | −2.363937E−02 |
| A10 | 3.252284E−01 | 4.200004E−01 | −4.801363E−02 | −7.606610E−02 | 9.985621E−03 | 4.445327E−03 |
| A12 | −8.808337E−02 | −2.346092E−01 | 6.797910E−04 | 1.685584E−02 | −1.085040E−03 | −5.427541E−04 |
| A14 | 3.468094E−03 | 5.572865E−02 | 2.491055E−03 | −2.094392E−03 | 6.795963E−05 | 4.440794E−05 |
| A16 | −8.150255E−03 | −4.097313E−03 | −2.915291E−04 | 1.170872E−04 | −1.944248E−06 | −1.850052E−06 |

The imaging lens in Example 4 satisfies conditional expressions (1) to (18) as shown in Table 6.

Figure 8:
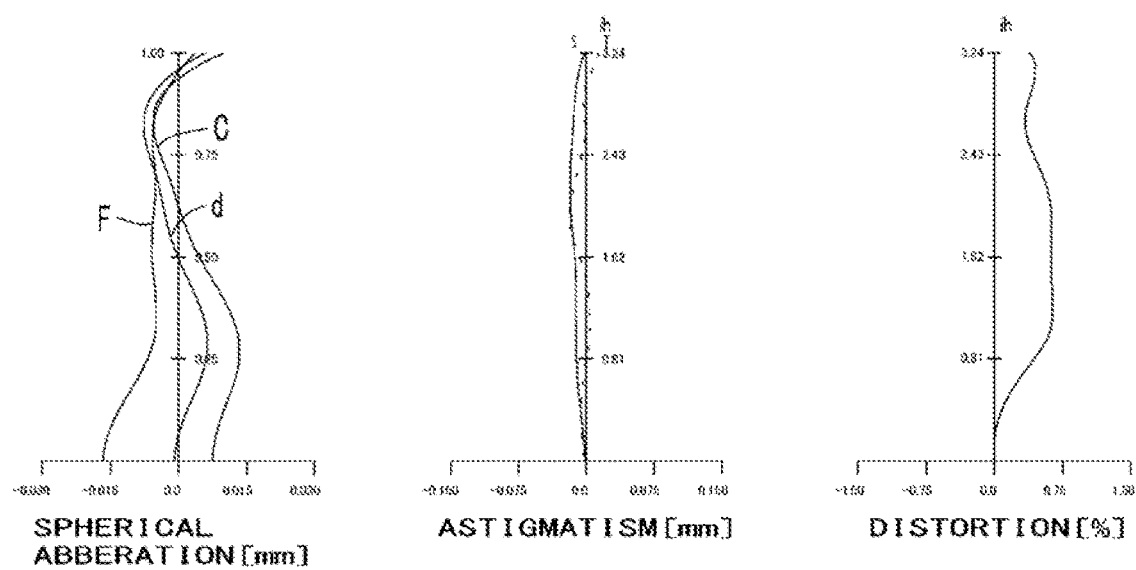
FIG. 8 shows spherical aberration, astigmatism, and distortion of the imaging lens in Example 4 according to the present invention.
Figure 9:
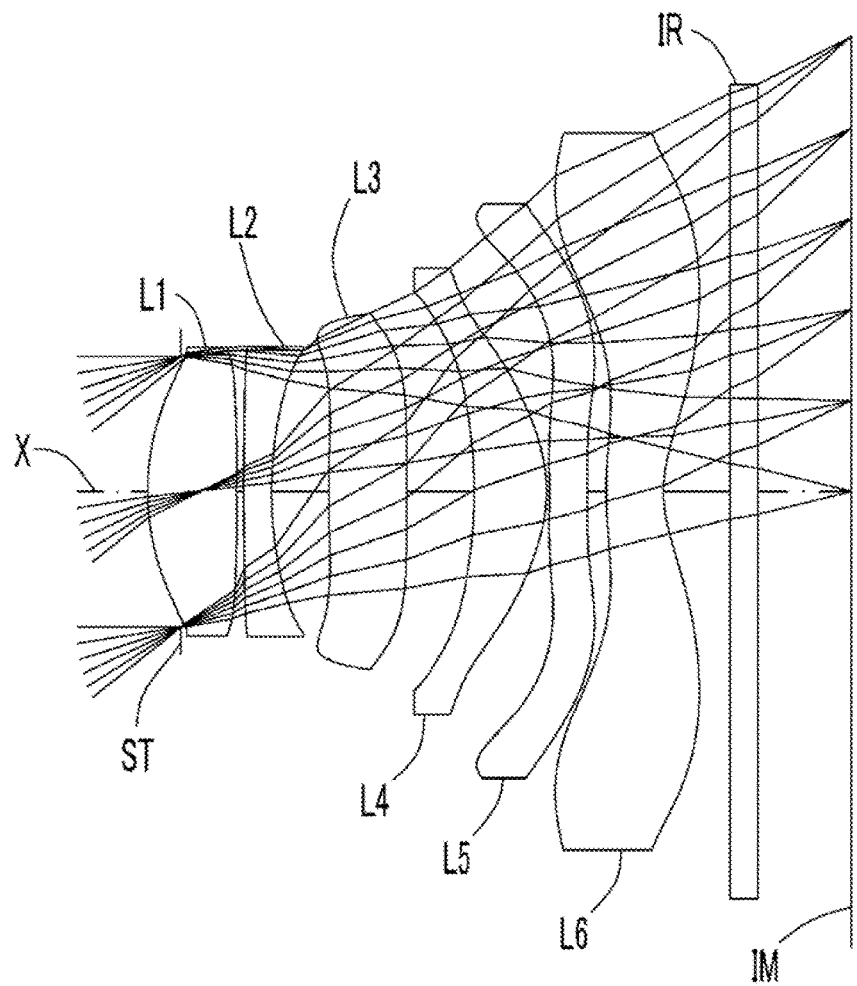
FIG. 9 is a schematic view showing the general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected properly.

EXAMPLE 5

The basic lens data of Example 5 is shown below in Table 5.

As explained above, according to the imaging lens related to the present embodiment, there is provided the low-profiled imaging lens having the total track length TTL smaller than 5.5 mm, and ratio of total track length to

TABLE 5

Numerical Data Example 5
Unit mm
f = 4.27
ih = 3.43
Fno = 2.1
TTL = 5.23
ω(°) = 38.5

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.2550 | | |
| 2* | 1.86178 | 0.6707 | 1.548 | 55.57 |
| 3* | 21.76777 | 0.0532 | | |
| 4* | 7.07417 | 0.2100 | 1.635 | 23.97 |
| 5* | 2.63643 | 0.4294 | | |
| 6* | 9.05306 | 0.5826 | 1.535 | 55.66 |
| 7* | 41.58308 | 0.5188 | | |
| 8* | −3.63280 | 0.5428 | 1.535 | 55.66 |
| 9* | −1.13730 | 0.0200 | | |
| 10* | −12.35172 | 0.2842 | 1.614 | 25.58 |
| 11* | 200.00000 | 0.1423 | | |
| 12* | 2.86396 | 0.4300 | 1.535 | 55.66 |
| 13* | 0.96657 | 0.4000 | | |
| 14 | Infinity | 0.2100 | 1.517 | 64.20 |
| 15 | Infinity | 0.8074 | | |
| Image Plane | Infinity | | | |

Constituent Lens Data

| Lens | Start Surface | Focal Length | Lens | Composite Focal Length |
|---|---|---|---|---|
| 1 | 2 | 3.700 | 1, 2 | 6.610 |
| 2 | 4 | −6.743 | 4, 5, 6 | 60.226 |
| 3 | 6 | 21.504 | | |
| 4 | 8 | 2.878 | | |
| 5 | 10 | −18.930 | | |
| 6 | 12 | −2.962 | | |

Aspheric Surface Data

| | Second Surface | Third Surface | Fourth Surface | Fifth Surface | Sixth Surface | Seventh Surface |
|---|---|---|---|---|---|---|
| k | 2.972958E−01 | 0.000000E+00 | 0.000000E+00 | −2.905292E+00 | 2.931844E+00 | 0.000000E+00 |
| A4 | −6.383646E−03 | −2.086126E−01 | −3.233565E−01 | −1.465219E−01 | −9.060342E−02 | −5.808354E−02 |
| A6 | −7.929640E−03 | 4.641200E−01 | 7.787728E−01 | 4.042391E−01 | −9.269508E−05 | −4.195923E−03 |
| A8 | −8.934368E−03 | −5.319908E−01 | −8.962525E−01 | −4.326454E−01 | −3.329472E−02 | −4.615407E−02 |
| A10 | 1.739995E−02 | 2.534023E−01 | 4.756345E−01 | 2.287212E−01 | 9.766109E−02 | 5.869883E−02 |
| A12 | −1.721855E−02 | −4.328440E−02 | −8.709017E−02 | −3.654397E−02 | −1.255067E−01 | −3.949908E−02 |
| A14 | 0.000000E+00 | 0.000000E+00 | 0.000000E+00 | 0.000000E+00 | 5.340164E−02 | 1.047796E−02 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 4.037163E−00 | −2.822123E+00 | 0.000000E+00 | 3.925078E−01 | 6.698689E−02 | −5.229519E+00 |
| A4 | −3.788506E−02 | 9.971118E−02 | 3.498470E−01 | 2.927777E−01 | −2.745891E−01 | −1.482677E−01 |
| A6 | 2.282913E−01 | −2.283374E−01 | −5.137572E−01 | −4.322567E−01 | 1.297225E−01 | 8.829294E−02 |
| A8 | −4.262543E−01 | 2.209017E−01 | 3.210641E−01 | 2.675333E−01 | −4.366632E−02 | −3.263190E−02 |
| A10 | 4.063333E−01 | −1.454457E−01 | −1.109200E−01 | −9.363435E−02 | 1.055905E−02 | 7.337939E−03 |
| A12 | −2.277229E−01 | 6.477896E−02 | 2.131299E−02 | 1.908369E−02 | −1.629806E−03 | −9.864258E−04 |
| A14 | 7.084995E−02 | −1.570687E−02 | −2.101211E−03 | −2.109248E−03 | 1.394233E−04 | 7.254945E−05 |
| A16 | −9.228534E−03 | 1.507351E−03 | 8.292536E−05 | 9.780182E−05 | −5.022727E−06 | −2.226674E−06 |

The imaging lens in Example 5 satisfies conditional expressions (1) to (3), (4) to (16) and (18) as shown in Table 6.

Figure 10:
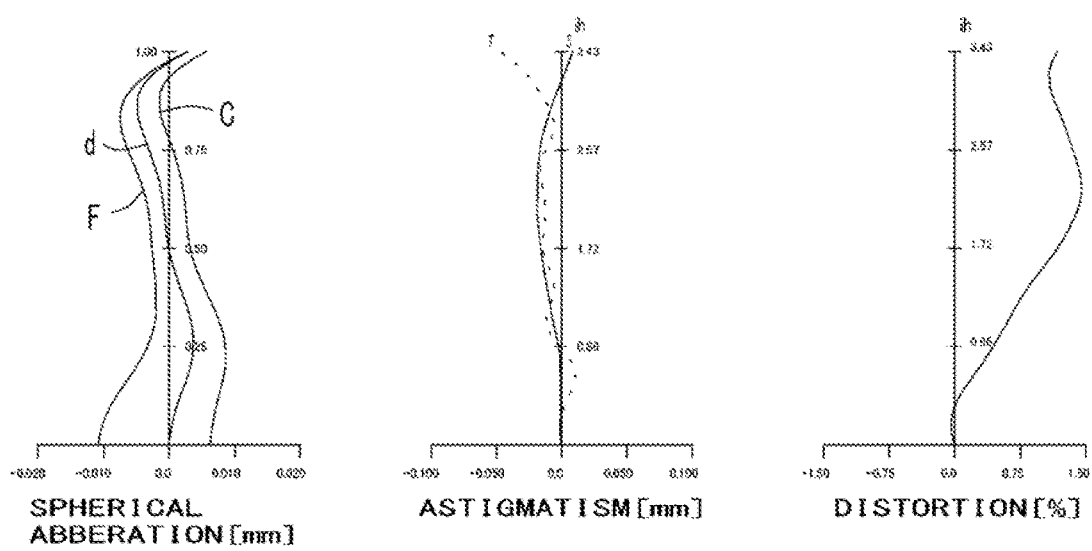
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected properly.

diagonal length (TTL/2ih) smaller than 0.8. There is realized photographing having brightness of F2.3 or less, and field of view of 2ω and 75 degrees or more.

In table 6, values of conditional expressions (1) to (18) related to the Examples 1 to 12 are shown.

TABLE 6

| Conditional Expression | | Example 1 | Example 2 | Example 3 | Example 4 | Example 5 |
|---|---|---|---|---|---|---|
| (1) | Σd/f | 0.87 | 0.87 | 0.91 | 0.85 | 0.91 |
| (2) | (T1/f)*100 | 1.41 | 1.01 | 1.08 | 1.30 | 1.25 |
| (3) | r4/f | 0.89 | 1.00 | 0.82 | 1.26 | 0.62 |
| (4) | TTL/2ih | 0.69 | 0.70 | 0.73 | 0.70 | 0.76 |
| (5) | T2/T3 | 0.44 | 1.14 | 1.02 | 1.36 | 0.83 |
| (6) | (T4/f)*100 | 0.43 | 3.72 | 0.49 | 2.78 | 0.47 |
| (7) | (T5/f)*100 | 5.26 | 4.78 | 5.92 | 4.89 | 3.34 |
| (8) | f1/f2 | −0.42 | −0.28 | −0.30 | −0.41 | −0.55 |
| (9) | f2/f | −1.81 | −3.32 | −3.14 | −1.75 | −1.58 |
| (10) | f3/f | 4.55 | 14.43 | 6.42 | 11.13 | 5.04 |
| (11) | f4/f | 7.56 | 2.47 | 6.42 | 2.66 | 0.67 |
| (12) | f6/f | −1.69 | −1.49 | −1.02 | −1.39 | −0.69 |
| (13) | r1/r2 | 0.19 | 0.32 | 0.27 | 0.13 | 0.09 |
| (14) | r7/r8 | 1.15 | 1.69 | 1.69 | 1.30 | 3.19 |
| (15) | r11/r12 | 1.90 | 1.91 | 2.75 | 2.08 | 2.96 |
| (16) | vd1−vd2 | 35.20 | 35.20 | 35.20 | 34.03 | 31.60 |
| (17) | \|vd3−vd4\| | 35.30 | 35.30 | 0.00 | 34.13 | 0.00 |
| (18) | \|r7\|/f | 0.95 | 1.00 | 0.67 | 0.56 | 0.85 |
| (a) | f12/f | 1.15 | 1.15 | 1.21 | 1.07 | 1.55 |
| (b) | f456/f | −2.22 | −5.15 | −4.18 | −3.29 | 14.11 |
| (c) | \|f5\|/f | Infinity | Infinity | Infinity | Infinity | 4.44 |

When the imaging lens having six lenses related to the present invention is applied to an imaging device mounted in an increasingly compact and low-profile smartphone or a mobile phone, a game console, an information terminal such as a PC and a robot, and a home appliance or a car with a camera function, it is possible to contribute to low-profileness and wide field of view, as well as high-performance of the camera.

According to the present invention, there is obtained a compact imaging lens with high-resolution which effectively realizes the low-profileness, satisfies low F-number and the wide field of view in well balance, and properly corrects various aberrations.

What is claimed is:

1. An imaging lens, comprising in order from an object side to an image side thereof:
   a first lens having positive refractive power and an object-side surface that is convex near an optical axis;
   a second lens having negative refractive power, a meniscus shape, and an image-side surface that is concave near the optical axis;
   a third lens that is a double-sided aspheric lens having positive refractive power and an image-side surface that is concave near the optical axis;
   a fourth lens having a meniscus shape, positive refractive power, and an object-side surface that is concave near the optical axis;
   a fifth lens that is a double-sided aspheric lens; and
   a sixth lens that is a double-sided aspheric lens having negative refractive power and an image-side surface that is concave near the optical axis,
   wherein at least one of the third to fifth lenses has a refractive index at d-ray (588 nm) which is more than 1.64 and less than 1.70, and conditional expressions (1) and (9) below are satisfied:

$$0.6 < \Sigma d/f < 1.0 \tag{1}$$

$$-4.5 \leq f2/f < -1.2 \tag{9}$$

where

Σd: distance along the optical axis from the object-side surface of the first lens to the image-side surface of the sixth lens, f: focal length of an overall optical system of the imaging lens, and f2: focal length of the second lens.

2. The imaging lens according to claim 1, wherein a conditional expression (2) below is satisfied:

$$0.5 < (T1/f)*100 < 2.0 \tag{2}$$

where T1: distance along the optical axis from an image-side surface of the first lens to an object-side surface of the second lens.

3. The imaging lens according to claim 1, wherein a conditional expression (3) below is satisfied:

$$0.5 < r4/f < 1.5 \tag{3}$$

where r4: curvature radius of the image-side surface of the second lens.

4. The imaging lens according to claim 1, wherein the third lens is a meniscus lens having an object-side surface that is convex near the optical axis.

5. The imaging lens according to claim 1, wherein an object-side surface and an image-side surface of the fifth lens have plane surfaces near the optical axis.

6. The imaging lens according to claim 1, wherein the second lens has a refractive index at d-ray which is more than 1.64 and less than 1.70.

7. The imaging lens according to claim 1, wherein a conditional expression (4) below is satisfied:

$$TTL/2ih \leq 0.8 \tag{4}$$

where

TTL: distance along the optical axis from the object-side surface of the first lens to an image plane, and ih: maximum image height.

8. The imaging lens according to claim 1, wherein a conditional expression (5) below is satisfied:

$$0.4 < T2/T3 < 1.5 \tag{5}$$

where

T2: distance along the optical axis from the image-side surface of the second lens to an object-side surface of the third lens, and T3: distance from the image-side surface of the third lens to the object-side surface of the fourth lens.

9. The imaging lens according to claim 1, wherein conditional expressions (6) and (7) below are satisfied:

$$0.2 < (T4/f) \ast 100 < 4.0 \quad (6)$$

$$2.0 < (T5/f) \ast 100 < 8.0 \quad (7)$$

where

T4: distance along the optical axis from an image-side surface of the fourth lens to an object-side surface of the fifth lens, and T5: distance from an image-side surface of the fifth lens to an object-side surface of the sixth lens.

10. The imaging lens according to claim 1, wherein a conditional expression (8) below is satisfied:

$$-0.70 < f1/f2 < -0.15 \quad (8)$$

where f1: focal length of the first lens.

11. The imaging lens according to claim 1, wherein a conditional expression (10) below is satisfied:

$$3.0 < f3/f \quad (10)$$

where f3: focal length of the third lens.

12. The imaging lens according to claim 1, wherein a conditional expression (11) below is satisfied:

$$0.5 < f4/f < 10.0 \quad (11)$$

where f4: focal length of the fourth lens.

13. The imaging lens according to claim 1, wherein a conditional expression (12) below is satisfied:

$$-2.5 < f6/f < -0.5 \quad (12)$$

where f6: focal length of the sixth lens.

14. The imaging lens according to claim 1, wherein a conditional expression (13) below is satisfied:

$$0.07 < r1/r2 < 0.35 \quad (13)$$

where r1: curvature radius of the object-side surface of the first lens, and r2: curvature radius of an image-side surface of the first lens.

15. The imaging lens according to claim 1, wherein a conditional expression (14) below is satisfied:

$$0.8 < r7/r8 < 3.5 \quad (14)$$

where r7: curvature radius of the object-side surface of the fourth lens, and r8: curvature radius of an image-side surface of the fourth lens.

16. The imaging lens according to claim 1, wherein a conditional expression (15) below is satisfied:

$$1.5 < r11 r12 < 4.0 \quad (15)$$

where r11: curvature radius of an object-side surface of the sixth lens, and r12: curvature radius of the image-side surface of the sixth lens.

17. The imaging lens according to claim 1, wherein conditional expressions (16) and (17) below are satisfied:

$$30 < vd1 - vd2 \quad (16)$$

$$30 < |vd3 - vd4| \quad (17)$$

where vd1: Abbe number of the first lens at d-ray,
vd2: Abbe number of the second lens at d-ray,
vd3: Abbe number of the third lens at d-ray, and
vd4: Abbe number of the fourth lens at d-ray.

18. The imaging lens according to claim 1, wherein a conditional expression (18) below is satisfied:

$$0.4 < |r7|/f < 1.5 \quad (18)$$

where r7: curvature radius of the object-side surface of the fourth lens.

* * * * *